(12) United States Patent
Zayhowski

(10) Patent No.: US 6,400,495 B1
(45) Date of Patent: Jun. 4, 2002

(54) LASER SYSTEM INCLUDING PASSIVELY Q-SWITCHED LASER AND GAIN-SWITCHED LASER

(75) Inventor: John J. Zayhowski, Pepperell, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/504,252

(22) Filed: Feb. 15, 2000

(51) Int. Cl.[7] .............................. H01S 3/00; H01S 3/10

(52) U.S. Cl. .......................... 359/333; 359/330; 372/21

(58) Field of Search ................................ 359/330, 333; 372/21, 22, 10, 92, 97

(56) References Cited

U.S. PATENT DOCUMENTS

| | | | |
|---|---|---|---|
| 5,181,211 A | 1/1993 | Burnham et al. | 372/21 |
| 5,237,577 A | 8/1993 | Keller et al. | 372/11 |
| 5,751,472 A | 5/1998 | Jeys et al. | 359/330 |
| 5,754,333 A | 5/1998 | Fulbert et al. | 359/330 |
| 5,802,083 A | 9/1998 | Birnbaum | 372/11 |
| 5,832,008 A | 11/1998 | Birnbaum et al. | 372/11 |

OTHER PUBLICATIONS

Spariosu, et al., "Dual Q Switching and Laser Action at 1.06 and 1.44 $\mu$m in $Nd^{3+}$:YAG-$Cr^{4+}$:YAG oscillator at 300 K", Opt. Lett., vol. 18, pp. 814–816, May 15, 1993.

Häring, R., et al., "Sub–nanosecond pulses from passively Q-switched microchip lasers at 1.53 $\mu$m," CFD6, 9:15 a.m., Cleo'99/Friday Morning, pp. 518–519.

Fulop, L., et al., "Compact microchip optical parametric oscillator," CFD1, 8:00 a.m., Cleo'99/Friday Morning, pp. 515–516.

Murray, J.T., et al., "2.5 W eye–safe solid–state Raman laser," WC4–1 to WC4–3, pp. 368–370.

Zayhowski, J., "Q-switched microchip lasers find real–world application," *Laser Focus World*, (1999, Aug. & Apr.).

Zayhowski, J.J., et. al., "Diode–pumped passively Q-switched picosecond microchip lasers," Optics Letters, Sep. 15, 1994, 19(18): 1427–1429 (1994).

Tikerpae, M., et al., "Theoretical Modelling of Diode Laser Pumped 3–$\mu$m $Er^{3+}$ Crystal Lasers," SPIE 2989:69–80.

Kubo, T.S., et al., "Diode–Pumped Lasers at Five Eye–Safe Wavelengths," IEEE J. of Quantum Electronics 28(4): 1033–1040 (1992).

Penzkofer, A., "Passive Q–Switching and Mode–Locking for the Generation of Nanosecond to Femtosecond Pulses," Appl. Phys. B 46:43–60 (1988).

Zayhowski, J.J., "Periodically Poled Lithium Niobate Optical Parametric Amplifiers Pumped by High–Power Passively Q–Switched Microchip Lasers," Optics Letters, 22 (3):169–171 (1997).

Moulton, P.F., "Tunable Titanium and Dye Lasers," (THQ1 Pulsed $Tl:Al_2O_3$ ring laser), Thursday Afternoon, Room 308, pp. 294–296 (Apr. 30, 1987).

Diettrich, J.C., et al., "Determination of thermal lensing in pulsed Cr:YAG lasers," Wednesday, Dept. of Physics, University of Otago, 09.00 CWD3, p. 152.

Brunel, M., et al., "Two–tunable–frequency microlasers passively Q–switched by $Cr^{4+}$:YAG," 9:00 a.m., Cleo'99/Friday Morning, CFD5 p. 518.

(List continued on next page.)

*Primary Examiner*—Mark Hellner
(74) *Attorney, Agent, or Firm*—Hamilton, Brook, Smith & Reynolds, P.C.

(57) ABSTRACT

A passively Q-switched laser is pumped by a first optical input signal to produce a train of optical pulses at a first wavelength. These pulses are then fed into a gain-switched laser. The absorption of energy at the first wavelength induces gain in the cavity of the gain-switched laser at a second wavelength, resulting in the spontaneous generation of an optical output pulse at a preferred eye-safe wavelength.

51 Claims, 3 Drawing Sheets

OTHER PUBLICATIONS

McKinnie, I.T., et al., "Temporal Characteristics and Dynamics of Gain–Switched Cr:YAG Lasers," Pure Appl. Opt. 6:759–772 (1997).

Chernikov, S.V., et. al., "Q–switching of $Er^{3+}Yb^{3+}$–doped fiber laser using backscattering form a fiber ring interferometer," CFJ3, 11:15 a.m., CLEO '96/Friday Morning, p. 529–530 (1996).

Petit, S., et al., "A Tunable Femtosecond Pulses Amplifier," Optics Communications 124:49–55 (1996).

Afzal, R. S., et al., "Efficient, Single–Mode, 1.5–mJ, passively Q–Switched Diode Pumped Nd:YAG Laser," OSA Trends in Optics and Photonics on Advanced Solid State Lasers, vol. 1, pp. 441–444, Jan. 31–Feb. 2, 1996.

Zayhowski, J. J., "Periodically Poled Lithium Niobate Optical Parametric Amplifiers Pumped by High–Power Passively Q–Switched Microchip Lasers" Optics Letters, Optical Society of America, vol. 22, No. 3, pp. 169–171, Feb. 1, 1997.

Zayhowski, J. J., "Microchip Lasers," Optical Materials, vol. 11, No. 2–3, pp. 255–267, Jan. 1999.

Dietrich, J. C., et al., "Efficient, kHz Repetition Rate, Gain–Switched Cr:Forsterite Laser," Applied Physics B (Lasers and Optics), vol. B69, pp. 203–206, Sep. 1999.

McKinnie, I. T., et al., "Single Frequency, Coupled Cavity Chromium Forsterite Laser," OSA Trends in Optics and Photonics on Advanced Solid State Lasers, vol. 1, pp. 72–75, Jan. 31–Feb. 2, 1996.

Pinto, J. F., et al., "Tunable Operation of Ce/sup 3+ / :LiSrAlF/sub 6/laser between 285 and 297 nm," CLEO '94, Summaries of Papers Presented at the Conference on Lasers and Electro–Optics, vol. 8, p. 64,1994.

Mittler, K., et al., "Broadband Operation of a Gain–Switched Ti :Sapphire Laser for Measurments with the Coherence Radar," Solid State Lasers VIII, pp. 234–241, Jan. 25–26, 1999.

LASER SYSTEM INCLUDING PASSIVELY Q-SWITCHED LASER AND GAIN-SWITCHED LASER

GOVERNMENT SUPPORT

This invention was made with government support under Contract Number F19628-95-C-0002 awarded by The Air Force. The Government has certain rights in the invention.

BACKGROUND OF THE INVENTION

Passively Q-switched microchip lasers are attractive light sources for applications requiring highly repeatable, high-peak-power pulses of short duration. Such devices are relatively simple to manufacture and are capable of withstanding substantial levels of vibrational and thermal shock. These laser devices have been most successfully implemented at output wavelengths near 1.0 $\mu$m. This is largely due to a lack of good combinations of gain media and saturable absorbers that support alternate wavelength outputs.

Many applications require a light source that operates in an eye-safe spectral region near 1.5 $\mu$m with short pulse duration and high peak power. There have been several attempts to construct such light sources using, for example, semiconductor saturable-absorber mirrors as passive Q switches for 1.5-$\mu$m lasers. Likewise, there have been attempts to develop 1.5-$\mu$m optical parametric devices pumped by 1-$\mu$m microchip lasers. Each of these approaches sacrifices some of the simplicity, robustness and cost advantage associated with the 1-$\mu$m passively Q-switched microchip laser.

SUMMARY

The present invention is generally directed towards a two-stage laser system including a passively Q-switched microchip laser and a gain-switched microchip laser. A pulse train generated by the passively Q-switched laser is fed into the gain-switched laser, which in turn produces an optical output signal at a preferred wavelength.

More particularly, the passively Q-switched laser of the present invention is pumped with an optical signal generated by, for example, a diode pump laser. Based on absorption of the optical signal, energy in the passively Q-switched laser then accumulates in its optical cavity until a threshold is reached. Thereafter, an output optical pulse, preferably at 1.064 $\mu$m, is produced. As mentioned, these optical pulses are then fed into the gain-switched laser.

In turn, energy accumulates in the optical cavity of the gain-switched laser where the gain medium absorbs the optical pulse from the Q-switched laser. Preferably, the gain medium is made from a YAG host doped with $Cr^{4+}$ ions, which have a large absorption cross section at 1.064 $\mu$m. As a result, light from the optical pulse efficiently inverts the transition near a second wavelength. This results in a gain in the gain-switched cavity at the second wavelength. By choosing an appropriate output coupler on the gain-switched laser, the gain induced by the absorbed 1.064-$\mu$m pulse leads to the development of an optical pulse at the second wavelength. Preferably, the output pulse at the second wavelength is at around 1.5 $\mu$m, which is an eye-safe wavelength.

The configuration of lasers in the present invention has many advantageous features not suggested by the prior art. For example, an eye-safe laser output is generated using a passively Q-switched laser coupled to a gain-switched laser. It is thus possible to use the laser system of the present invention in applications where there is a danger of laser-light exposure to the human eye. Additionally, the material used to construct the laser system of the present invention is capable of withstanding harsh environmental conditions such as vibrational and thermal shock. Furthermore, no high-speed control electronics or high voltages are required, in contrast to systems employing actively Q-switched lasers. Hence, the two-stage laser system is reliable and can be employed in many safety-critical applications.

Another advantageous feature of the laser system of the present invention is its overall construction. The material used to construct such a laser system is relatively inexpensive and the compound laser device itself is simple to manufacture. Such a laser system is therefore an attractive solution for many diverse low-budget applications.

Figure 1:
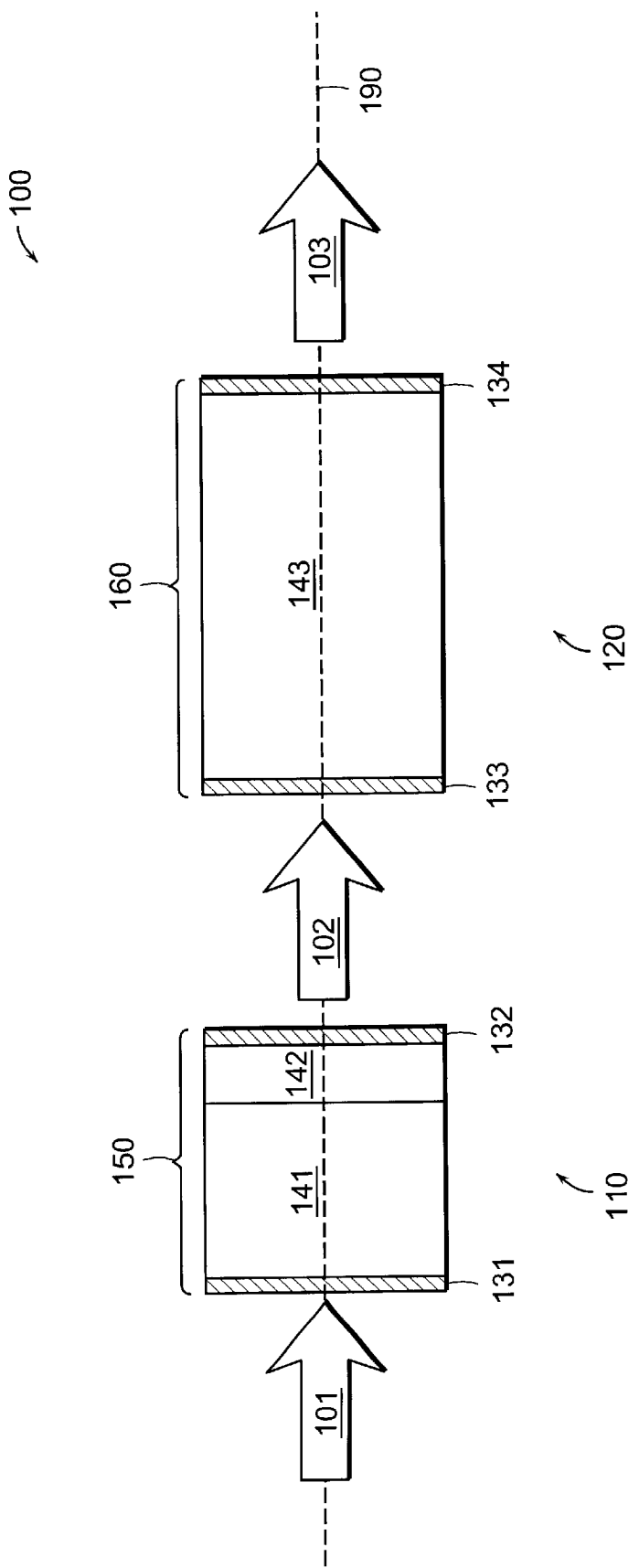
FIG. 1 is a block diagram illustrating various components of a preferred embodiment of the two-stage laser system of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF CERTAIN EMBODIMENTS

FIG. 1 is a block diagram illustrating the various components of a preferred embodiment of the present invention. As shown, the laser system 100 includes a passively Q-switched microchip laser 110 that is pumped by a first optical input 101. Preferably, first optical input 101 is generated by a 1-watt continuous-wave diode pump laser (not shown) operating at around 808 nm. Optionally, other optical energy sources may be used to pump passively Q-switched laser 110.

The passively Q-switched microchip laser 110 includes a first gain medium 141 bonded to a solid-state saturable absorber 142. In one embodiment, the first gain medium 141 is a YAG host material doped with $Nd^{3+}$ ions, while saturable absorber 142 is a YAG host material doped with $Cr^{4+}$ ions.

The exterior faces of the first gain medium 141 and the saturable absorber 142 normal to optical axis 190 are polished flat and parallel to each other. A first mirror 131 and second mirror 132 applied to the polished faces define a first resonant cavity 150.

First mirror 131 located at the input end of first resonant cavity 150 is made from a dielectric coating that passes first optical input 101 at 808 nm and reflects 1.064-$\mu$m light. This allows optical energy at 808 nm into the first cavity 150 while it also supports reflections at the first wavelength 1.064 $\mu$m within the first resonant cavity 150. At the opposite, or output, end of cavity 150 is located second mirror 132, which is formed by a dielectric coating on the output face of saturable absorber 142.

It should be noted that the first gain medium 141 and saturable absorber 142 are diced into squares. Typically, each square is 1–2 mm on a side.

Forming a passively Q-switched laser 110 from a combination of separately doped materials has advantages over the use of a monolithic device. For example, each of the constituent materials of saturable absorber 142 and first gain medium 141 are more easily optimized for a particular application. Additionally, it is easier to more precisely control the characteristics of the passively Q-switched laser 110 by adjusting the volume of saturable absorber 142 and first gain medium 141 within first resonant cavity 150. Accordingly, the simplicity of constructing the passively Q-switched laser 110 based on these methods renders it possible to produce a small, robust and high-precision laser device that is inexpensive to manufacture.

Operating characteristics of the passively Q-switched laser 110 are heavily dependent on the purity of the saturable absorber 142. In operation, the intracavity saturable absorber 142 prevents lasing until the average inversion density within the cavity reaches a critical threshold. Above this threshold, the onset of lasing produces a high intracavity optical field that saturates the saturable component of the optical loss in saturable absorber 142, increasing the Q of the first resonant cavity 150. The gain in first resonant cavity 150 then supports the spontaneous generation of an optical pulse 102 at a first wavelength from the end of the passively Q-switched microchip laser 110. The wavelength of the optical pulse at the first wavelength is 1.064 µm as mentioned, and each pulse has an energy on the order of microjoules (µJ) and time duration near several hundred picoseconds (ps).

The train of optical pulses 102 generated by passively Q-switched laser 110 is fed into gain-switched microchip laser 120. A third mirror 133 and fourth mirror 134 at each end of the gain-switched microchip laser 120 define a second resonant cavity 160. Second gain medium 143 is disposed between the third mirror 133 and fourth mirror 134.

Third mirror 133, formed by a dielectric coating applied to a polished input face of second gain medium 143, is highly transmissive at the wavelength of optical pulse 102. Accordingly, optical energy from the optical pulse 102 passes into the second resonant cavity 160 of the gain-switched microchip laser 120. At the same time, the third mirror 133 is highly reflective at a second predetermined wavelength. This second wavelength is near 1.5 µm and corresponds to the wavelength of output pulse 103 that is generated by the gain-switched microchip laser 120.

The opposite surface of second gain medium 143 is coated with a dielectric material to produce a fourth mirror 134, which reflects light at the first wavelength, i.e., 1.064 µm, of optical pulse 102. This allows double-pass absorption of light at the first wavelength within second resonant cavity 160.

The reflectivity of the fourth mirror 134 at the second wavelength of 1.5 µm is chosen to optimize performance of the gain-switched microchip laser. Fourth mirror 134 is partially reflective to support intracavity reflections of optical signals at the second wavelength within second resonant cavity 160. At the same time, fourth mirror 134 is partially transmissive to support the output of optical energy at the second wavelength from second resonant cavity 160.

The spontaneous generation and amplification of light at the second wavelength within the second resonant cavity 160 is supported by second gain medium 143 disposed between third mirror 133 and fourth mirror 134. The second gain medium 143 also has flat and parallel surfaces, i.e., supporting third mirror 133 and fourth mirror 134, normal to an optical-output axis 190. Additionally, the second gain medium 143 is constructed from a YAG host material doped with $Cr^{4+}$ ions, i.e., $Cr^{4+}$:YAG.

The large absorption cross section of the $Cr^{4+}$ ions in YAG at the first wavelength (of optical pulse 102) results in a saturation fluence that is much less than the fluence obtained directly from passively Q-switched microchip laser 110. For example, the saturation fluence for $Cr^{4+}$:YAG at 1.064 µm is approximately 16 mJ/cm$^2$, while the fluence in it second gain medium 143 resulting from optical pulse 102 may typically be more than ten times greater. As a result, optical pulse 102 at 1.064 µm bleaches the absorption of light within the second resonant cavity 160 at the first wavelength and efficiently inverts the transition to produce light at the second wavelength. In this way, light at a first wavelength from optical pulse 102 is converted via second gain medium 143 to the second wavelength, forming output pulse 103.

In one embodiment, the length of the second resonant cavity 160 is chosen so that energy from optical pulse 102 is absorbed along the entire length. To produce an energy of 2 µJ/pulse in a 100-µm diameter output pulse 103, the length of resonant cavity 160 should be approximately 5 millimeters, assuming an unsaturated absorption of 6 cm$^{-1}$ at the first wavelength. The above configuration will support a round-trip gain of approximately 10% at the second wavelength.

The use of an output coupler (fourth mirror 134) having a 3% transmissivity supports the development of an output pulse 103 at the second wavelength with an energy of approximately 2 µJ and pulse duration of 5 ns. To produce shorter output pulses 103, second gain medium 143 is made from a YAG host with a higher doping concentration of $Cr^{4+}$. Also, the use of a longer second resonant cavity and higher-energy pump lasers will lead to proportionally higher-energy output pulses 103 at the second wavelength. These, as well as other aspects of laser system 100, may be optionally adjusted to serve the needs of a particular application.

The shortest pulse that can be generated from a gain-switched laser is:

$$t_w = \frac{8.1 t_{rt}}{\ln(G_{rt})},$$

where $t_w$ is the pulse width of output pulse 103 measured at half its maximum value, $t_{rt}$ is the round-trip time of light in laser cavity 160, and $G_{rt}$ is the small-signal round-trip gain of second resonant cavity 160 when output pulse 103 begins to form.

The above equation for $t_w$ is accurate if the round-trip loss $L_{rt}$ in resonant cavity 160 is given by the equation:

$$-\ln(1-L_{rt}) = 0.32\ \ln(G_{rt}).$$

Preferably, most of the loss in the second resonant cavity 160 will be due to loss from output coupling.

The round-trip time, $t_{rt}$, of a monolithic gain-switched laser 120 (as described in a preferred embodiment above) can be determined based on the following equation:

$$t_{rt} = \frac{2nl}{c},$$

where n is the refractive index of the material in the cavity (second gain medium 143), l is the length of the cavity and c is the speed of light in vacuum.

The small-signal round-trip gain, $G_{rt}$, is mathematically described as:

$$G_{rt} = exp(2n_i \sigma l),$$

where $n_i$ is the inversion density averaged over the volume of the oscillating mode and $\sigma$ is the effective gain cross section of an inverted ion. Hence, the shortest duration of an output pulse 103 is:

$$t_w = \frac{8.1n}{cn_i\sigma}.$$

The maximum inversion density $n_i$, for pump pulse 102 having a fixed energy, is achieved by pumping the gain-switched laser 120 with pulses of short duration. The duration of the pump pulse is preferably less than 5 times the duration of output pulse 103. Based on such a pump-pulse duration, all of the pump energy will be used to support a higher gain in the resonant cavity 120 of the gain-switched laser, thus producing a higher-energy output pulse 103.

In a preferred embodiment as described above, the $Cr^{4+}$:YAG has an absorption coefficient of 6 $cm^{-1}$ at a maximum inversion density of $n_i \cong 10^{18}$ $cm^{-3}$; the effective gain cross section $\sigma$ at 1.42 $\mu$m equals $1.7\times10^{-19}$ $cm^2$; and the refractive index of the gain medium is n=1.818. Based on this embodiment, the shortest possible pulse is $t_w$=2.9 ns. In practice, the actual pulse width is typically longer because it is not possible to obtain 100% inversion in the second resonant cavity 160.

The energy of output pulse 103 is given by the equation:

$$E_p = \zeta V n_i h \frac{c}{\lambda},$$

where $\zeta$ is the extraction efficiency of the output pulse 103, which is typically 90%, V is the volume of the oscillating mode in the gain-switched laser, h is Planck's constant, and $\lambda$ is the free-space wavelength of oscillation.

The gain-switched laser 120 optionally includes an air gap or other optical elements in addition to the gain medium 143 itself. In such a case, the output pulse 103 will be longer because the round-trip time of light will increase without a commensurate increase in round-trip gain within the second resonant cavity 160. However, the inclusion of certain optical elements renders it possible to advantageously control transverse modes and frequencies within the cavity.

For example, consider a resonant cavity including $Cr^{4+}$:YAG, which has a transition centered at 1.42 $\mu$m and a large bandwidth. A frequency-selective element is optionally included in the cavity for fine tuning the output pulse 103 at a wavelength between 1.3 and 1.6 $\mu$m.

In an alternate embodiment including a frequency-selective element, a gain-switched $Ti:Al_2O_3$ laser pumped by the second harmonic of a passively Q-switched Nd:YAG laser is optionally tuned to produce an output wavelength in the near-infrared region. Likewise, a $Ce^{3+}$ laser pumped by the fourth harmonic of a passively Q-switched laser is optionally tuned to generate an output pulse 103 at a wavelength in the near-ultraviolet region.

Figure 2:
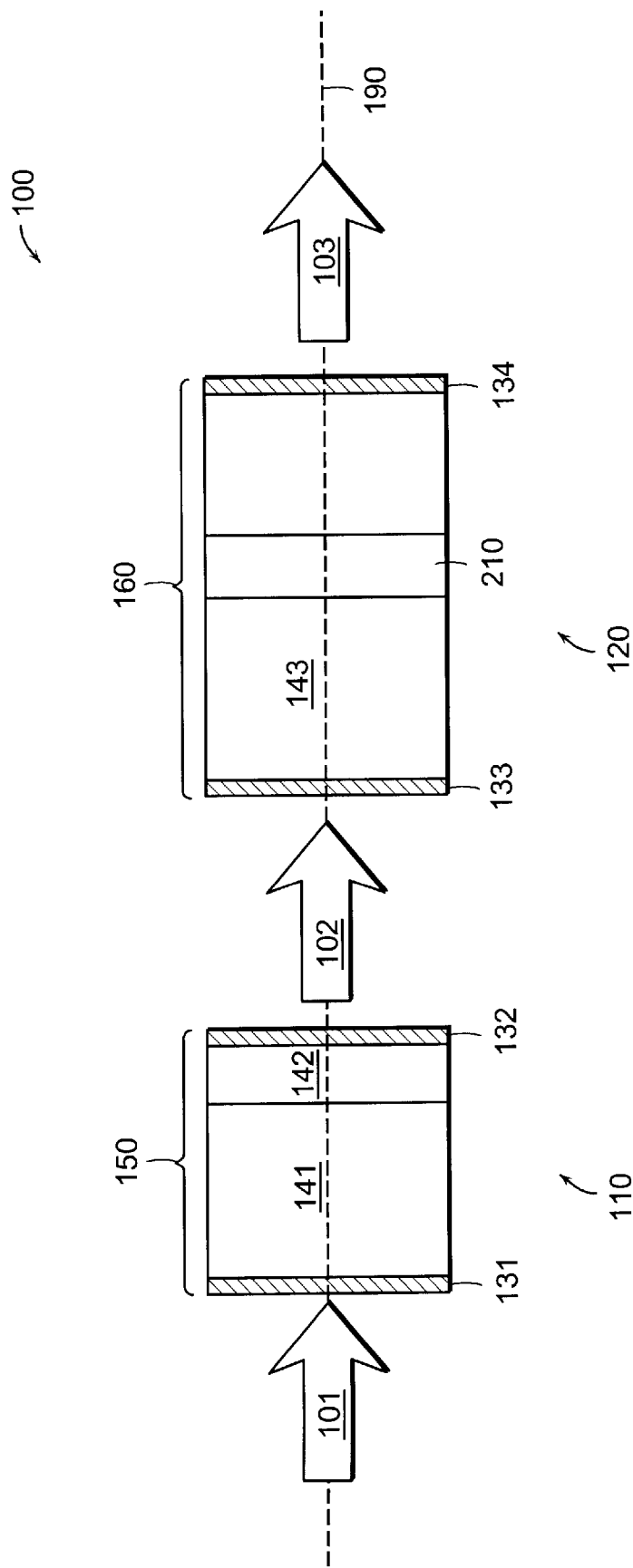
FIG. 2 is a block diagram of an embodiment of the present invention including optical elements for intracavity harmonic conversion.

Another potential embodiment of laser system 100 as shown in FIG. 2 involves the inclusion of nonlinear optical elements 210 within the second resonant cavity 160. For example, nonlinear optical elements 210 are optionally used to achieve intracavity harmonic conversion.

Figure 3:
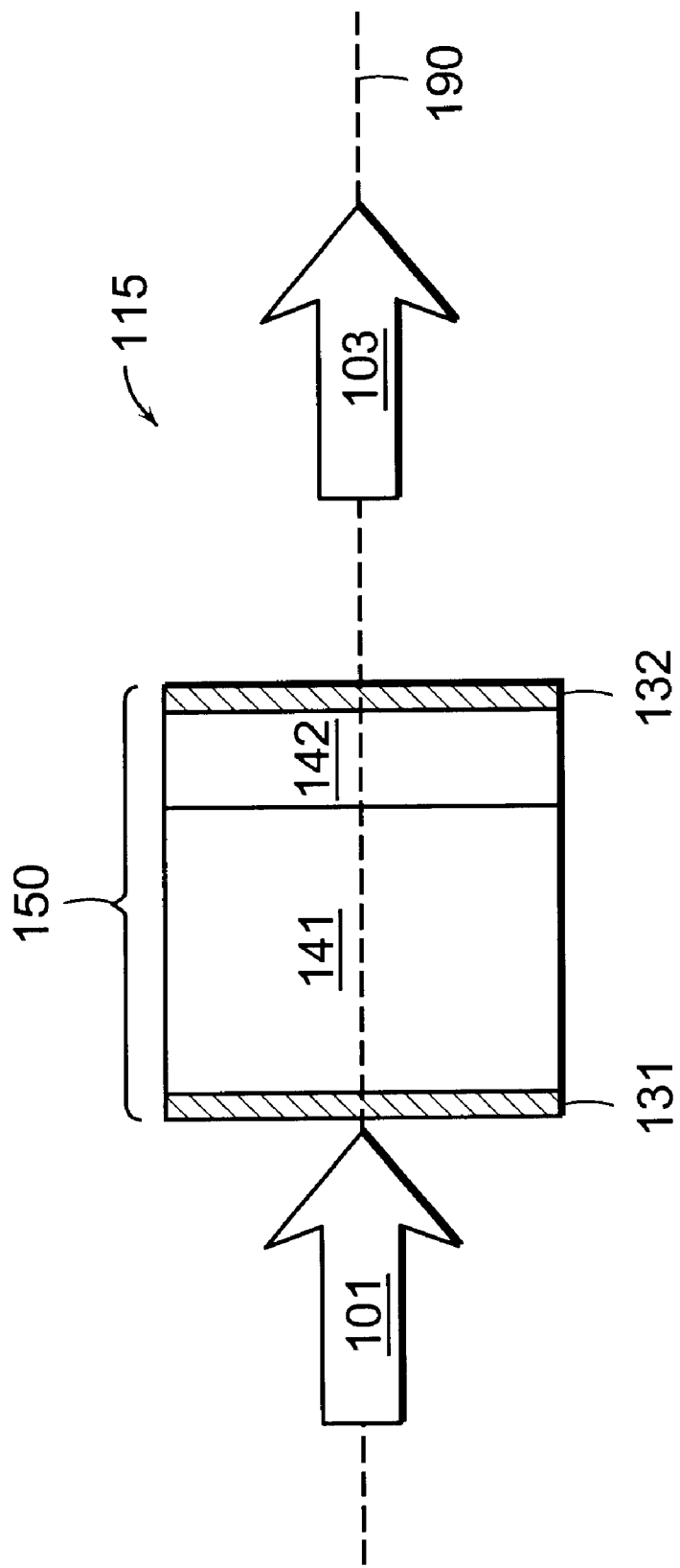
FIG. 3 is a block diagram of an embodiment of the present invention as a singular device.

Yet another embodiment of laser system 100 involves combining aspects of the two-stage laser as described above into a single device 115, which is pictorially depicted in FIG. 3 using the same general components and corresponding numerals. However, an eye-safe optical output signal 103 near 1.5 $\mu$m is generated by a single-stage laser incorporating both a passively Q-switched laser and a gain-switched laser in doubly resonant cavity 150.

For example, a Nd-doped-YAG laser gain medium 141 is passively Q-switched using a $Cr^{4+}$:YAG saturable absorber 142. Similar to the embodiment mentioned above, a first mirror 131 and second mirror 132 formed by dielectric coatings disposed at either end of cavity 150 support reflections therein. The generation of pulses at the first wavelength is achieved by passive Q switching. Energy at the first wavelength is absorbed by the saturable absorber 142. Similar to the principles described in the embodiments above, inversion in the $Cr^{4+}$:YAG supports sufficient gain to generate a gain-switched output pulse 103 at an eye-safe wavelength such as 1.5 $\mu$m.

While this invention has been particularly shown and described with references to certain embodiments thereof, it will be understood by those skilled in the art that various changes in form and details may be made therein without departing from the spirit and scope of the invention as defined by the appended claims.

What is claimed is:

1. A laser system comprising:
   a first optical signal generated by a solid-state device;
   a passively Q-switched laser coupled to receive the first optical signal, wherein the passively Q-switched laser generates a train of optical pulses; and
   a gain-switched laser, coupled to receive the train of optical pulses, producing an optical output signal.

2. A laser system as described in claim 1, wherein the first optical signal is generated by a solid-state laser.

3. A laser system as described in claim 1, wherein the first optical signal is generated by a diode laser.

4. A laser system as described in claim 1, wherein the passively Q-switched laser is a solid-state device.

5. A laser system as described in claim 1, wherein the gain-switched laser is a solid-state device.

6. A laser system as described in claim 1, wherein the gain-switched laser includes a solid-state gain medium having dielectric cavity mirrors applied directly thereon.

7. A laser system as described in claim 1, wherein the passively Q-switched laser includes a gain medium that utilizes a transition in $Nd^{3+}$.

8. A laser system as described in claim 7, wherein passive Q switching is supported by a transition in $Cr^{4+}$.

9. A laser system as described in claim 1, wherein the gain-switched laser utilizes a transition in $Cr^{4+}$ to produce the optical output signal.

10. A laser system as described in claim 9, wherein the gain-switched laser includes a gain medium of $Cr^{4+}$:YAG.

11. A laser system as described in claim 1, wherein the gain-switched laser is tunable over a range of wavelengths.

12. A laser system as described in claim 1, wherein the gain-switched laser includes at least one nonlinear optical element for performing intracavity wavelength conversions.

13. A laser system as described in claim 1, wherein the passively Q-switched laser is harmonically converted before pumping the gain-switched laser.

14. A laser system as described in claim 13, wherein the first optical signal is generated by a diode laser.

15. A laser system as described in claim 13, wherein the first optical signal is generated by a solid-state laser.

16. A laser system as described in claim 13, wherein the passively Q-switched laser is a solid-state device.

17. A laser system as described in claim 13, wherein the gain-switched laser is a solid-state device.

18. A laser system as described in claim 13, wherein the gain-switched laser includes a solid-state gain medium having dielectric cavity mirrors applied directly thereon.

19. A laser system as described in claim 13, wherein the passively Q-switched laser includes a gain medium that utilizes a transition in $Nd^{3+}$.

20. A laser system as described in claim 19, wherein passive Q switching is supported by a transition in $Cr^{4+}$.

21. A laser system as described in claim 13, wherein the gain-switched laser utilizes a transition in $Ti:Al_2O_3$ to produce the optical output signal.

22. A laser system as described in claim 13, wherein the gain-switched laser utilizes a transition in $Ce^{3+}$ to produce the optical output signal.

23. A laser system as described in claim 13, wherein the gain-switched laser is tunable over a range of wavelengths.

24. A laser system as described in claim 13, wherein the gain-switched laser includes at least one nonlinear optical element for performing intracavity wavelength conversions.

25. A light output system comprising:
a first input signal generated by a solid-state device;
a first gain medium fed by the first input signal, an output of the first gain medium generated by passive Q switching; and
a second gain medium fed by the output of the first gain medium, an output of the second gain medium generated by gain switching.

26. A light output system as described in claim 25, wherein the first gain medium accumulates energy from the first input signal until a threshold is reached, thereafter producing the output of the first gain medium at a first wavelength.

27. A light output system as described in claim 25, wherein the second gain medium absorbs energy at a first wavelength from the output of the first gain medium inducing gain in the second gain medium, the second gain medium supporting a corresponding output at a second wavelength.

28. A light output system as described in claim 27, wherein the second gain medium is doped with an ion that has a large absorption cross section to absorb the output of the first gain medium.

29. A light output system as described in claim 27, wherein the second gain medium is doped with an ion that absorbs the output of the first gain medium and supports an optical gain at an eye-safe wavelength.

30. A system comprising:
a first resonant cavity defined by a dielectric material between two reflective plates, wherein a first optical output is generated by passively Q switching the first cavity, the first resonant cavity being pumped by a solid-state device; and
a second resonant cavity defined by a dielectric material between two reflective plates, wherein the first optical output is fed into the second cavity to control gain switching therein, the second resonant cavity producing an optical output at a predetermined wavelength.

31. A laser system as described in claim 30, wherein the first optical signal is a train of optical pulses at a wavelength near 1.064 micrometers.

32. A laser system as described in claim 31, wherein a mirror in the second resonant cavity disposed to receive the train of pulses at a first surface normal to an optical axis is coated to be highly transmissive at a wavelength of the first optical output and highly reflective at a wavelength produced in the second resonant cavity.

33. A laser system as described in claim 32, wherein the second resonant cavity includes a second surface disposed at an optical output end parallel to the first surface that is coated to be reflective of a wavelength of the first optical output and partially transmissive of a wavelength produced in the second resonant cavity.

34. A laser system as described in claim 30, wherein the second resonant cavity produces an eye-safe optical output signal at around a wavelength of 1.5 micrometers.

35. A laser system comprising:
a first optical signal pumped by a solid-state device;
a passively Q-switched laser coupled to receive the first optical signal, wherein the passively Q-switched laser generates a train of optical pulses; and
a gain-switched laser, coupled to receive the train of optical pulses, producing an optical output signal centered near 1.5 micrometers.

36. A resonant cavity having mirrors disposed at either end including:
a first gain medium pumped by a solid-state device; and
a saturable absorber coupled to the first gain medium, the first gain medium being passively Q-switched using the saturable absorber, wherein the saturable absorber additionally supports gain switching in the resonant cavity to produce an eye-safe output.

37. A method of producing a light source comprising the steps of:
providing an optical pump input;
feeding the optical pump input into a passively Q-switched laser to generate a train of optical pulses at a first wavelength; and
coupling a gain-switched laser to receive the train of optical pulses at the first wavelength, wherein the gain-switched laser produces an optical output signal at a second wavelength.

38. A laser system comprising:
a solid-state pump means for providing a first optical signal at around an 808-nanometer wavelength;
a passively Q-switched laser means coupled to the pump means for receiving the first optical signal, wherein the passively Q-switched laser means generates a train of pulses at a wavelength near 1.064 micrometers; and
a gain-switched laser means coupled to receive the train of pulses at a first surface normal to an optical axis that is coated to be highly transmissive at a wavelength near 1.064 micrometers and highly reflective at a wavelength near 1.5 micrometers, the gain-switched laser means having a second surface disposed at an output end that is parallel to the first surface and that is coated to be partially transmissive of wavelengths near 1.5 micrometers, wherein the gain-switched laser means produces an eye-safe optical output signal at around a wavelength of 1.5 micrometers.

39. A method comprising:
generating a first optical signal from a solid-state device;
receiving the first optical signal at a passively Q-switched laser device; and
pumping a $Ce^{3+}$ gain-switched laser device with a fourth-harmonic output of the passively Q-switched laser device to produce an optical output signal.

40. A method as in claim 39, wherein the optical output signal of the gain-switched laser is at a wavelength in the near-ultraviolet region.

41. A method as in claim 40, wherein the passively Q-switched laser is a Nd:YAG laser.

42. A method as in claim 39 wherein the step of pumping a $Ce^{3+}$ gain-switched laser device with a fourth-harmonic output of the passively Q-switched device includes:

at the $Ce^{3+}$ gain-switched laser device, receiving the fourth-harmonic output of the passively Q-switched laser at a first surface normal to an optical axis that is coated to be highly transmissive at a wavelength of the fourth-harmonic output and highly reflective at the output wavelength of the gain-switched laser.

43. A method as in claim 42, wherein the optical output signal of the gain-switched laser is at a wavelength in the near-ultraviolet region.

44. A method comprising:

generating a first optical signal from a solid-state device;

receiving the first optical signal at a passively Q-switched laser device; and pumping a $Ti:Al_2O_3$ gain-switched laser device with a second-harmonic output of the passively Q-switched laser device to produce an optical output signal.

45. A method as in claim 44, wherein the optical output signal of the gain-switched laser is at a wavelength in the near-infrared region.

46. A method as in claim 45 wherein the passively Q-switched laser is a Nd:YAG laser.

47. A method as in claim 44 wherein the step of pumping a $Ti:Al_2O_3$ gain-switched laser device with a second-harmonic output of the passively Q-switched device includes:

at the $Ti:Al_2O_3$ gain-switched laser device, receiving the second-harmonic output of the passively Q-switched laser at a first surface normal to an optical axis that is coated to be highly transmissive at a wavelength of the second-harmonic output and highly reflective at the output wavelength of the gain-switched laser.

48. A method as in claim 47, wherein the optical output signal of the gain-switched laser is at a wavelength in the near-infrared region.

49. A method comprising:

generating a first optical signal from a solid-state device;

receiving the first optical signal at a passively Q-switched laser device;

pumping a gain-switched laser device with a harmonic output of the passively Q-switched device to produce an optical output signal.

50. A laser system comprising:

a solid-state pump device that produces a first optical signal;

a passively Q-switched laser device that receives the first optical signal; and a $Ce^{3+}$ gain-switched laser device coupled to receive a fourth harmonic of the passively Q-switched laser device, the fourth harmonic being received at a first surface normal to an optical axis that is coated to be highly transmissive at the fourth harmonic and highly reflective at an output wavelength.

51. A laser system comprising:

a solid-state pump device that produces a first optical signal;

a passively Q-switched laser device that receives the first optical signal; and a $Ti:Al_2O_3$ gain-switched laser device coupled to receive a second harmonic of the passively Q-switched laser device, the second harmonic being received at a first surface normal to an optical axis that is coated to be highly transmissive at the second harmonic and highly reflective at an output wavelength.

* * * * *